Feb. 23, 1937.  A. L. DOHERTY  2,071,393
GAS SEPARATOR
Filed March 14, 1935  2 Sheets-Sheet 2

Inventor
Arthur Lloyd Doherty

By Owen & Owen
Attorneys

Patented Feb. 23, 1937

2,071,393

UNITED STATES PATENT OFFICE 2,071,393

GAS SEPARATOR

Arthur Lloyd Doherty, Toledo, Ohio, assignor to The Harbauer Company, Toledo, Ohio, a corporation of Ohio Application March 14, 1935, Serial No. 11,101

10 Claims. (Cl. 183—2.5)

This invention relates to means for removing gas from liquids, and particularly to means for use in connection with the handling of catsup for removing gases therefrom preparatory to bottling.

The object of the invention is the provision of a novel apparatus of the class described, whereby the air or gases entrained in the catsup during its manufacture is effectively abstracted therefrom before the bottling process.

The invention is fully described in the following specification, and while in its broader aspect it is capable of embodiment in numerous forms, one embodiment thereof is illustrated in the accompanying drawings, in which—

Figure 1:
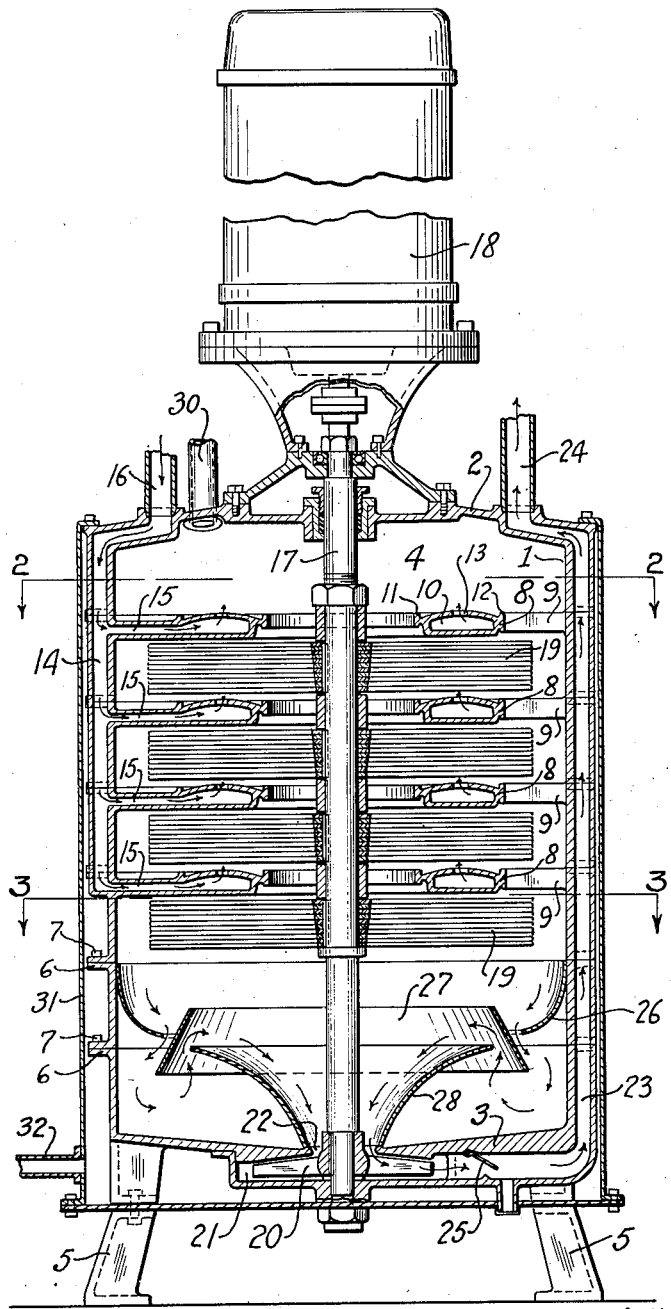
Figure 2:
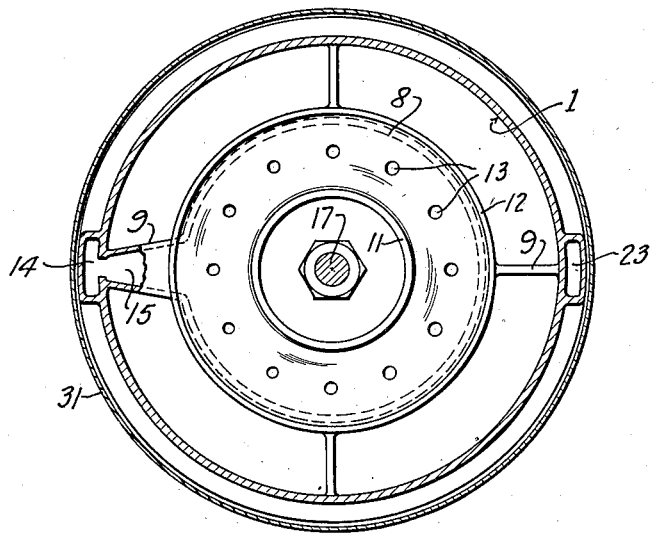
Figure 3:
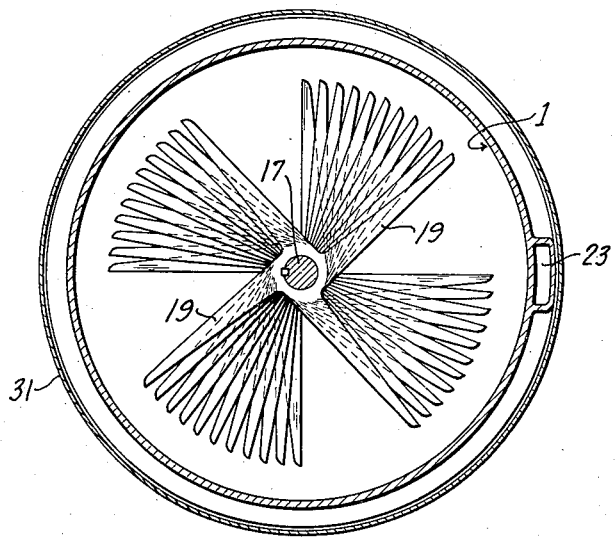

Figure 1 is an elevation of an apparatus embodying the invention, with a part in central vertical section and with parts broken away, and Figs. 2 and 3 are sections on the lines 2—2 and 3—3 in Fig. 1.

Referring to the drawings, 1 designates a shell or housing of cylindrical form and having a top 2 and bottom 3 cooperating therewith to form a chamber 4. The shell 1 is disposed in upright position with its lower end provided with supporting legs 5 and is shown, in the present instance, as being built up in sections, which have abutting flanges 6 held together by bolts or screws 7.

Arranged in vertically spaced superposed order within the shell 1 are a plurality of annular liquid distributing members 8, with the lower member disposed a distance above the chamber bottom and with each member provided with a plurality of circumferentially spaced radial arms 9 attached at their outer ends to the shell. Each member 8 forms an annular conduit 10 of substantially flat form, with its top convex in cross-section and provided at the inner and outer edges thereof with upstanding flanges 11 and 12, respectively, to form an open top trough around the top portion of the member, and preferably in substantial concentric relation to the vertical axis of the shell. Each conduit 10 has communication with the trough formed on the top thereof through a plurality of openings 13 arranged around the top of the conduit. It is thus apparent that when liquid under pressure is introduced into a conduit 10, it is distributed therearound and flows therefrom through the openings 13 into the trough formed on the top of the member by the flanges 11 and 12. The liquid then overflows said flanges and falls down in the chamber 4 to be acted on by agitating elements, as hereinafter described, to effect a thorough liberation of the entrained gases therefrom.

Each conduit 10 receives its liquid from a common supply conduit 14 formed vertically in one side of the shell wall and having a branch 15 extending inwardly therefrom to each conduit 10 through one of the carrying arms 9 of the respective distributing member 8, which arm is made larger for such purpose. The conduit 14 extends to the top of the shell where it has communication with the supply source through a conduit 16.

A shaft 17 is disposed vertically within the shell 1 coaxially therewith, and has its ends journaled in bearings provided in the upper and lower ends of the shell. The upper end of the shaft is extended vertically above the shell and is directly connected, in the present instance, to the shaft of a motor 18 mounted on the top of the shell. The shaft extends through the central opening of each annular distributing member 8 and below each of such members is provided with a set of beater arms 19. Each of such sets, in the present instance, is made up of a plurality of superposed spiders, each of which has four arms 19 radiating therefrom and each spider of a set, when positioned on the shaft, has its arms turned slightly relative to the arms of the spider next above, thus placing the arms of each set in spirally disposed order, as shown in Fig. 3. The shaft 17 is rapidly driven, so that the liquid overflowing from the inner and outer trough edges of the respective distributing members 8 is thoroughly broken up by the beating action of the arms and thrown outward thereby against the wall of the shell, as is apparent.

The lower end of the shaft 17 has a pump wheel 20 attached thereto, the blades of which operate in a pump chamber 21 formed on the bottom 3 of the shell. The shaft projects through a centrally disposed opening 22 in the top of the pump chamber, which opening provides communication between the bottom of the chamber 4 and the pump chamber.

The discharge from the pump chamber is through a conduit 23 formed in the side wall of the shell 1 and extending to the top of the shell where it has communication through a conduit 24 with the bottling machine (not shown). An outwardly opening check-valve 25 is shown in the inner end portion of the conduit 23.

An annular inwardly deflecting flange 26 is provided in the shell 1 a distance above the bottom of the shell and below the lowermost set of beaters 19, such flange being downwardly and inwardly curved and having its upper edge fixed to the side wall of the shell, so that the liquid flowing down such side wall will be inwardly deflected by the flange. Within the opening of the flange 26 is provided a deflecting member 27 of truncated cone-form, with its small end uppermost and with its lower end extending outward a sufficient distance relative to the wall of the opening through the flange 26 to stand in the path of any liquid flowing down from such edge wall. A flared bell-shaped deflector 28 is provided in the extreme bottom portion of the chamber 4 with its small end resting on the shell bottom around the discharge opening 22 and with its upper outwardly flared end disposed within the conical member 27 in spaced relation to its wall. It is thus apparent that the liquid, which is thrown outwardly against the wall of the shell 1 by the centrifugal action of the agitators 19, passes down the shell wall to the flange 26 by which it is deflected inwardly into contact with the conical member 27, which effects a divergence of the flow of the liquid to enter the portion of the shell below said flanges. The liquid is then caused to change its course and pass upwardly through the cone 27 to the edge of the member 28 which it overflows and down which it passes to the pump chamber. This irregular course of the liquid causes it to swirl at various points, thereby facilitating the liberation of any gases which have become entrained therein and which were not liberated by the beating action.

The top of the chamber 4 is connected through a pipe 30 to an air pump or suction creating means (not shown), whereby a suction is set up within the chamber 4 to withdraw therefrom all gases liberated from the liquid.

It is important, in the handling of catsup and some other liquids preparatory to canning, to maintain the liquid in a highly heated state. This is accomplished, in the present instance during the passage of liquid through the apparatus, by providing the shell with an exterior jacket 31 which forms a steam space around the side wall and bottom of the shell. This steam space has suitable inlet and outlet passages for the steam, one of which is shown at 32 (Fig. 1).

It is found, in the use of my apparatus, that the air and gases entrained and generated in the liquid during the various treating processes is effectually liberated therefrom by reason of the thorough manner in which the liquid is agitated and broken up in the chamber 4, and that the liquid discharged from such chamber and delivered to the bottling machine is practically free of gases. This is highly important in the canning of catsup, as it not only enhances the quality of the catsup but prevents or lessens to a minimum deterioration thereof during long periods of storage.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an apparatus of the class described, a shell forming a chamber in which a vacuum is maintained, a vertical shaft mounted in said chamber, means for driving said shaft, beater means carried by the shaft, a liquid distributing member disposed within the chamber above the beater means and comprising an annular trough having inner and outer edges over which a liquid supplied thereto may flow and fall into contact with said beater means, means for directing a liquid to said trough, and means in the bottom of the chamber for discharging liquid therefrom.

2. In an apparatus of the class described, a heated shell forming a chamber in which a vacuum is maintained, a vertical shaft in said chamber, means for driving said shaft, a plurality of sets of beater elements carried by the shaft, a plurality of annular liquid distributing members disposed around the shaft in vertically spaced superposed relation to each other with a member disposed above each set of beater elements, each of said members including a trough extending around the shaft and a liquid distributing conduit beneath each trough and in communication therewith at various points through the bottom of the trough, each of said troughs having an upstanding flange at one or both of its inner and outer edges over which liquid flows from the trough down onto the subjacent beater elements, means for directing a supply of liquid to the conduit of each distributing member, and means for discharging liquid from the bottom of the chamber.

3. In an apparatus of the class described, a shell forming a chamber in which a vacuum is maintained, said chamber having an outlet in its bottom, means for effecting a forced discharge of liquid through said outlet, a bell-shaped baffle member extending upwardly and outwardly from the edge wall of said opening, a downwardly and inwardly extending baffle member disposed within the chamber and attached to its wall, said upper member having a central opening spaced outwardly from the edge of said first baffle member, a third baffle member disposed between the adjacent edges of said first two members and causing liquid to flow in a circuitous course from the upper member down around the lower edge of the second member and thence upwardly over the upper edge of the first member, means for discharging a liquid into the chamber above said baffle members, and means to agitate such liquid and throw it outwardly against the shell wall.

4. In an apparatus of the class described, a shell forming a chamber in which a vacuum is maintained, a jacket enclosing said shell and forming a space therearound for a heating fluid, means forming a discharge conduit having communication with the bottom of the chamber and extending upward through said heating space and thence to a point of discharge, a driven shaft mounted vertically in said chamber, means driven by said shaft for creating a forced discharge of liquid through said conduit, beater means carried by the shaft within the chamber, means for distributing a liquid to the interior of the chamber and causing it to flow in a plurality of streams down onto the beating means, and means for directing liquid to said distributing means and including a conduit extending down through a portion of said heating space.

5. In an apparatus for liberating gas from hot catsup or like syrupy liquid, a chamber, means for exhausting liberated gases from the chamber, rotatable beater means in the chamber having circumferentially spaced beater members extending outwardly from the axis of rotation of the beater means, means for introducing the liquid into the chamber and for discharging against the beater members in a pair of spaced circular paths each intermediate the ends of the beater members, means for heating the chamber to cause the liquid to be highly heated thereby to assist in liberation of the gas, and means to rotate the beater means at a speed to break up the gas globules into fine spray form.

6. In an apparatus for liberating gas from hot catsup or like syrupy liquid, a chamber, means for exhausting liberated gases from the chamber, rotatable beater means in the chamber having circumferentially spaced beater members extending outwardly from the axis of rotation of the beater means, means for introducing the liquid into the chamber including a substantially ring-like hollow member overlying the beater members and located intermediate the ends of the latter, the top of the member having outlets communicating with the interior of the member whereby to cause the liquid to flow upwardly through the outlets and thence downwardly over the top of the member and onto the beater means, and means to rotate the beater means.

7. An apparatus for liberating gas from hot catsup or like syrupy liquid in accordance with claim 6, wherein the outlets are located centrally between the sides of the member and the top of the latter is formed to cause the liquid to flow outwardly in opposite directions and then downwardly in spaced streams over the sides of the member and onto the beater members.

8. In an apparatus for liberating gas from hot catsup or like syrupy liquid, a chamber, means for maintaining a vacuum in the chamber, rotatable beating means in the chamber composed of sets of beater arms which latter extend outwardly from the axis of rotation of the beater means, the arms of the beater means being circumferentially spaced and the sets being arranged in superposed order to constitute a battery, the arms of the sets being progressively spaced to lie in advance of the next succeeding set thereby to provide a spiral-like arrangement of the arms, means for introducing catsup into the chamber, and means to rotate the beating means at a speed to break up the gas globules in the catsup into spray form and of such degree of fineness so as to be liberated from the catsup and be removed from the chamber by the vacuum means.

9. In an apparatus for liberating gas from hot catsup or like syrupy liquid, a chamber, means for maintaining a vacuum in the chamber, rotatable beating means in the chamber having a multiplicity of circumferentially spaced beater arms extending outwardly from the axis of rotation of the beater means and having their outer end portions surrounded by free space, means for introducing the liquid in the chamber against points circumferentially of and intermediate the ends of the beater arms, means to heat the liquid throughout to a uniform and high degree, and means to rotate the beating means at a speed to break up the gas globules in the liquid into spray form of such fineness to be liberated from the liquid and removed from the chamber by the vacuum means.

10. In an apparatus for liberating gas from hot catsup or like syrupy liquid, a chamber, means for maintaining a vacuum in the chamber, rotatable beating means in the chamber having a multiplicity of circumferentially spaced beater arms extending outwardly from the axis of rotation of the beater means and having their outer end portions surrounded by free space, means for introducing the liquid in the chamber against and at points circumferentially of and intermediate the ends of the beater arms, means to heat the liquid throughout to a uniform and high degree, and means to rotate the beating means at a speed to break up the gas globules in the liquid into spray form and to also forcibly hurl same against the side walls of the chamber whereby they are further broken up by impact against the chamber walls and resultantly are of such fineness to be liberated from the liquid and removed from the chamber by the vacuum means.

ARTHUR LLOYD DOHERTY.